July 10, 1928. Re. 17,031

G. A. STEINER

TOWEL CABINET

Original Filed Jan. 3, 1922

Inventor
GEORGE A. STEINER
By Paul, Paul & Albers
Attorneys

Reissued July 10, 1928. Re. 17,031

UNITED STATES PATENT OFFICE.

GEORGE ADOLPH STEINER, OF SALT LAKE CITY, UTAH, ASSIGNOR TO STEINER SALES COMPANY, OF SALT LAKE CITY, UTAH, A CORPORATION OF UTAH.

TOWEL CABINET.

Original No. 1,596,125, dated August 17, 1926, Serial No. 526,574, filed January 3, 1922. Application for reissue filed January 30, 1928. Serial No. 250,647.

The object of my invention is to provide a towel cabinet having clean and soiled towel rolls so mounted that the clean portion of the towel will be kept out of contact with the soiled portion.

A further object is to provide such an arrangement of the towel and control rolls that the withdrawal of the clean portion of the towel from its roll will operate to wind the soiled portion of the towel upon its roll.

Other objects of the invention will appear from the following detailed description.

In the accompanying drawings forming part of this specification,

Figure 2:
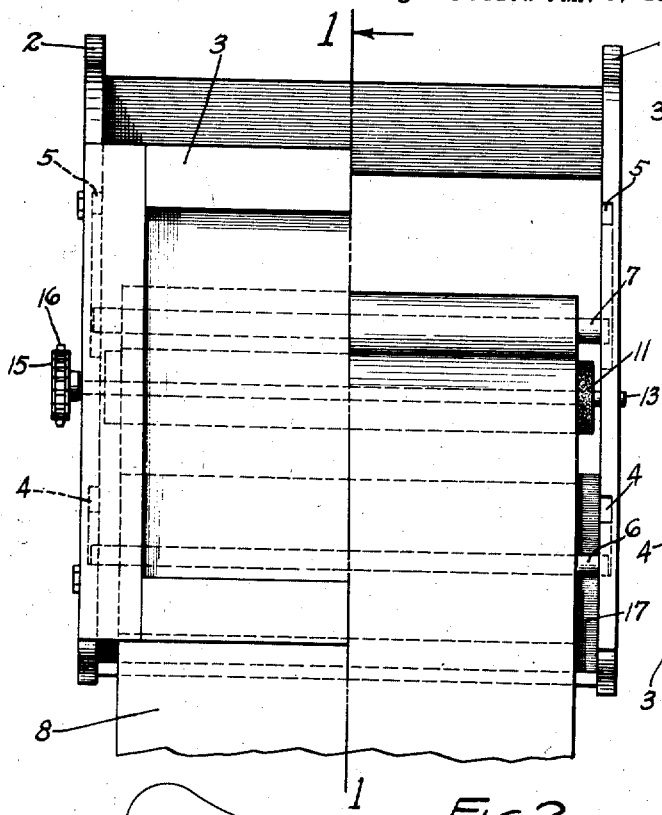
Figure 2 is a front elevation with the door partially broken away, showing the relative arrangement of the rolls in the cabinet.
Figure 1:
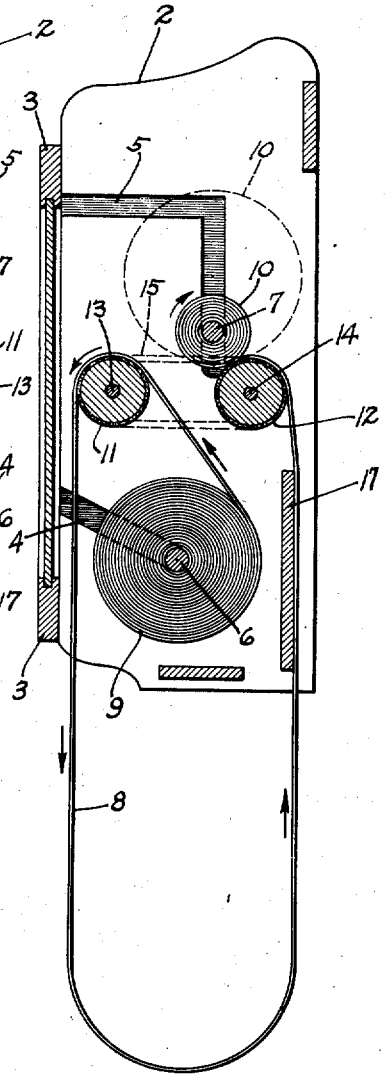
Figure 1 is a vertical sectional view through a towel cabinet embodying my invention, on the line 1—1 of Figure 2.
Figure 3:
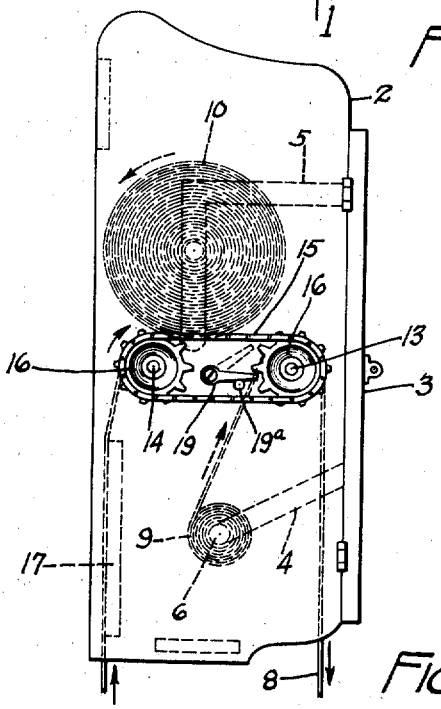
Figure 3 is a side elevation of the cabinet.

In the drawing, 2 represents a towel cabinet having a suitable door 3 in the front thereof and slots 4 and 5 in the side walls into which the spindles 6 and 7 of the clean and soiled towel rolls are respectively inserted. The slots for the clean towel roll are preferably inwardly and downwardly inclined, while the inner portion of the slots for the soiled towel roll are preferably vertical, so that when the rolls are inserted into the slots they will be suspended between the walls of the cabinet by gravity, being free to rise and fall in the slots in the operation of unwinding the clean towel from one roll and winding up the soiled portion of the towel on the other roll.

The clean towel 8 is wound on the shaft 6 and fed from this roll to the shaft 7 in the slots 5. The lower portion of the cabinet is open, so that the towel hangs in a loop below the cabinet, with the clean section to the front where it can be conveniently reached by a person standing below and in front of the cabinet.

It is desirable as the clean towel is unwound from its roll to wind up the soiled portion of the other roll and with this end in view I provide control or feed rolls 11 and 12 mounted on shafts 13 and 14 journaled in the side walls of the casing, the roll 12 being driven from the roll 11, preferably by a sprocket chain 15 and wheels 16 mounted on the shafts 13 and 14. The soiled towel roll is arranged to rest by gravity upon the roll 12 to be revolved by contact therewith, but I prefer to mount the roll 11 or the feed roll for the clean towel roll out of contact with this roll and preferably above it, and then carry the loose clean end of the towel from the roll over this feed or control roll, and then downwardly to a point where the clean end of the towel can be grasped by the user. A downward pull on this portion of the towel revolves the clean towel roll to feed the towel therefrom and also exerts a downward pressure on the roll 11, causing the towel to cling to the roll and revolve it and at the same time transmit motion through the chain 15 to the roll 12 to revolve it and the soiled towel roll and wind up the soiled end of the towel as fast as it is used. A dog 19 is arranged to engage the teeth of one of the sprocket wheels, a pin 19ª preventing movement of the dog in one direction and locking the sprockets against backward movement.

In the bottom of the cabinet near the rear wall I prefer to provide a vertical partition 17 between which and the rear of the cabinet is a vertical passage through which the towel is fed upwardly to the soiled towel roll, said partition preventing the soiled section of the towel from swinging forward into contact with the clean end of the towel and this, of course, is a desirable feature in any towel cabinet where the highest degree of sanitary conditions should be attained.

When the clean towel has been entirely unwound from its roll, the door 3 may be opened and the soiled towel removed and returned to the laundry and a clean one inserted. The operation may then be repeated.

It will be noted that the feed rolls in this application are arranged upon substantially the same level, one at the front and the other at the rear of the cabinet, and I am thus able to bring the towel rolls nearer together and make the cabinet smaller and more compact. This arrangement of the feed rolls also provides a wide gap or space between the clean portion of the depending loop of the towel and the used or soiled portion and this, of course, is always desirable.

I claim as my invention:

1. A towel cabinet comprising a casing, a clean towel roll in the lower portion of said cabinet, a soiled towel roll in the upper portion of said cabinet, a feed roll mounted in the rear of the cabinet below and sufficiently close to the soiled towel roll so that the feed roll will rest against said soiled towel roll, a second feed roll in the front of the cabinet and having a driving connection with said first named feed roll and arranged to be normally out of contact with said clean towel roll, the loose end of the towel from said clean towel roll passing up over said second feed roll and thence depending in the front part of the cabinet downwardly, thence upwardly through the rear of the cabinet over said rear feed roll to the soiled towel roll.

2. A towel cabinet comprising a casing, a clean towel roll mounted in the lower portion of said casing, the upper portion of said casing having slots therein and a soiled towel roll mounted to rest by gravity therein, a feed roll mounted in the rear portion of the cabinet to contact with the under side of said soiled towel roll, a second feed roll in the front portion of the cabinet in approximately the same horizontal plane as the other feed roll and having a driving connection with said first named feed roll and arranged to receive the loose end of the clean towel from said clean towel roll from which it depends in the front part of the cabinet in front of the clean towel feed roll, thence through the bottom of the cabinet and under the same and thence upwardly through the rear portion of the cabinet over the first mentioned feed roll, and onto the soiled towel roll, as described.

3. A towel cabinet comprising a casing, clean and soiled towel rolls mounted therein, a feed roll mounted below and arranged to contact with the soiled towel roll, a second feed roll in approximately the same horizontal plane as the other feed roll and having a driving connection with said first named feed roll and arranged to be out of contact with the clean towel roll, the loose clean toweling passing over said second feed roll thence depending down in front of the clean towel roll to operate the same when the user exerts a downward pull on the towel, the soiled end of the towel passing upwardly at the rear of the casing to the soiled towel roll therein, and a partition mounted in said casing and separating the soiled portion of the towel from said clean towel roll.

4. A towel cabinet comprising a casing, clean and soiled towel rolls mounted therein, feed rolls interposed between said towel rolls and arranged one in front and the other in the rear portion of the casing and on substantially the same level and having a driving connection between them, the soiled towel roll contacting by gravity with one of said feed rolls and the loop of clean toweling passing over the other feed roll and depending from said roll in the front portion of the casing thence below said casing and carried upwardly through the rear portion of the casing to said soiled towel roll, the location of said feed rolls separating the clean and soiled portions of the towel and a guiding means to further prevent the soiled portion of the towel from contacting with the clean towel roll.

5. A towel cabinet comprising a casing, a clean towel roll in the lower part of the casing, a feed roll above the clean towel roll in front of and out of contact with the same and from which the clean towel depends through the front part of the casing and in front of the clean towel roll, thence through the bottom of the casing near its front edge, a guard in the rear of the casing in back of which the soiled towel extends upwardly, a second feed roll above the guard and in substantial horizontal alignment with the first mentioned feed roll, and a soiled towel roll resting on the second mentioned feed roll substantially as described.

6. A towel cabinet comprising a casing adapted to receive a supply of clean towel, a soiled towel take-up roll slidable in guides in said casing, a pair of friction surfaced feed rolls comprising a rear roll positioned to contact with said take-up roll to wind the soiled towel web thereon, and move said take-up roll vertically in said guides as its diameter increases, a forward roll having a driving connection with said rear roll for simultaneous movement, the web of clean towel being stretched from the towel supply into contact with the forward feed roll and from thence depending below the forward portion of said casing to form a loop, the soiled end of the towel web passing upwardly at the rear of the casing to said soiled towel take-up roll, said rear and forward rolls being on substantially the same level, whereby the parts of the cabinet may be more compactly arranged, and less manufacturing material and less space vertically required for the cabinet, the operation of said forward roll delivering a clean length of towel web and winding up a corresponding soiled length on said take-up roll.

7. A towel cabinet comprising a casing adapted to receive a supply of clean towel, feed rolls arranged one in front of the other in said casing and on substantially the same level to allow compact arrangement of the cabinet parts and permit it to occupy less space vertically, said feed rolls having a driving connection between them for simultaneous movement, a soiled towel take-up roll arranged to contact with one of said feed rolls to wind up the soiled towel, the web of clean towel engaging the other feed roll and depending therefrom in the form of a loop and carried to said soiled towel take-up roll, the operation of said feed rolls delivering a length of clean web and winding up a corresponding length of soiled web on said take-up roll, the relative position of said feed rolls and take-up roll being such that contact of the soiled web with the clean web feed roll is prevented during the winding of the soiled web on said take-up roll.

8. A towel cabinet comprising a casing, clean and soiled towel rolls mounted therein, a feed roll mounted and arranged to contact with the soiled towel roll, a second feed roll in approximately the same horizontal plane as the other feed roll, and having a driving connection with said first named feed roll and arranged to be out of contact with the clean towel roll, the horizontal arrangement of said rolls permitting compact construction of said cabinet and its occupancy of less space vertically, the loose clean toweling contacting with the said second feed roll, thence depending downwardly into a loop, thence passing upwardly at the rear of the casing to the soiled towel roll therein, and means mounted in said casing and separating the soiled portion from the clean portion of the towel.

9. A towel cabinet comprising a casing adapted to receive a roll of clean towel, a soiled towel take-up roll mounted in said casing, a pair of feed rolls, one being mounted in the rear of the cabinet and having a friction surface in contact with the soiled towel web on said take-up roll, the other feed roll being mounted in the front of the cabinet and having a friction surface and a driving connection with said first named feed roll for simultaneous movement therewith, said feed rolls being adapted to prevent contact of the soiled web with the forward roll during the winding operation, the relative location of said feed rolls being such that a space comparatively shallow in depth and short vertically is required for said casing, the loose end of the towel web from said clean towel roll passing over said second feed roll and from thence depending in the front portion of the cabinet below the same and from thence upwardly through the rear of the cabinet and contacting with said first named feed roll to be wound upon the soiled towel take-up roll when said second feed roll is operated to deliver a length of clean towel.

10. A towel cabinet having mechanism therein for keeping separated the front clean portion of a towel web from the rear soiled portion, comprising a support for a towel supply and a soiled towel take up roll, two feed rolls geared together to move in unison, one feed roll approximately on a level with and back of the other in the cabinet, the rear feed roll being in contact with and supporting the take up roll the front feed roll being in the front portion of the cabinet and in contact with the clean portion of the towel so that the web of toweling may hang down therefrom and the clean portion thereof be removed from the soiled portion of the towel web a maximum distance in said cabinet.

In witness whereof I have hereunto set my hand this 19th day of January, 1928.

GEORGE ADOLPH STEINER.